United States Patent
Hachiya et al.

(10) Patent No.: US 7,307,114 B2
(45) Date of Patent: Dec. 11, 2007

(54) POLYCARBONATE RESIN COMPOSITION FOR USE IN THE PRODUCTION OF A SUBSTRATE FOR AN OPTICAL INFORMATION MEDIUM

(75) Inventors: Hiroshi Hachiya, Kurashiki (JP); Takashi Adachi, Kurashiki (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 614 days.

(21) Appl. No.: 10/839,217

(22) Filed: May 6, 2004

(65) Prior Publication Data

US 2004/0225047 A1 Nov. 11, 2004

(30) Foreign Application Priority Data

May 7, 2003 (JP) ............................. 2003-129367

(51) Int. Cl.
*C08K 5/103* (2006.01)
*C08G 64/04* (2006.01)

(52) U.S. Cl. ................ 524/312; 524/314; 528/196

(58) Field of Classification Search ........... 524/312, 524/314; 528/196
See application file for complete search history.

(56) References Cited

U.S. PATENT DOCUMENTS

| | | | |
|---|---|---|---|
| 4,025,540 A | 5/1977 | Kleemann et al. | |
| 4,798,767 A | 1/1989 | Aoki et al. | |
| 4,880,896 A | 11/1989 | Otsubo et al. | |
| 5,589,564 A | 12/1996 | Komiya et al. | |
| 5,596,067 A | 1/1997 | Komiya et al. | |
| 5,840,826 A | 11/1998 | Komiya et al. | |
| 6,448,365 B1 * | 9/2002 | Funakoshi et al. | 528/196 |
| 6,486,241 B2 * | 11/2002 | Sawano | 524/109 |
| 6,747,080 B2 * | 6/2004 | Hachiya et al. | 524/306 |
| 2002/0183428 A1 | 12/2002 | Hachiya et al. | |

FOREIGN PATENT DOCUMENTS

| | | |
|---|---|---|
| JP | 51-65705 | 6/1976 |
| JP | 60-113201 A | 6/1985 |
| JP | 63-97627 A | 4/1988 |
| JP | 63-316313 A | 12/1988 |
| JP | 4-146922 A | 5/1992 |
| JP | 7-169092 A | 7/1995 |
| JP | 8-73724 A | 3/1996 |
| JP | 2001-49104 A | 2/2001 |
| JP | 2001-49105 A | 2/2001 |
| JP | 2001-192543 A | 7/2001 |
| JP | 2001-192544 A | 7/2001 |
| JP | 2004-27106 A | 1/2004 |
| WO | WO 97/32916 A1 | 9/1997 |

* cited by examiner

*Primary Examiner*—Tae H Yoon
(74) *Attorney, Agent, or Firm*—Birch, Stewart, Kolasch & Birch, LLP

(57) ABSTRACT

A polycarbonate resin composition for use in the production of a substrate for an optical information medium, comprising (A) an aromatic polycarbonate resin having a weight average molecular weight of from 13,000 to 18,000, wherein the aromatic polycarbonate resin (A) is produced by subjecting an aromatic dihydroxy compound and a carbonic diester to a transesterification reaction, and is substantially free of a chlorine atom; and (B) a partial ester obtained from a saturated aliphatic carboxylic acid having 10 to 30 carbon atoms and a di- to hexahydric alcohol, wherein the partial ester (B) has an acid value of from 2 to 20 mgKOH.

4 Claims, No Drawings

POLYCARBONATE RESIN COMPOSITION FOR USE IN THE PRODUCTION OF A SUBSTRATE FOR AN OPTICAL INFORMATION MEDIUM

This Nonprovisional application claims priority under 35 U.S.C. 119(a) on Patent Application No. 2003-129367 filed in Japan on May 7, 2003, respectively, the entire contents of which are hereby incorporated by reference.

BACKGROUND OF THE INVENTION

1. Field of the Invention

The present invention relates to a polycarbonate resin composition for use in the production of a substrate for an optical information medium. More particularly, the present invention is concerned with a polycarbonate resin composition for use in the production of a substrate for an optical information medium, comprising (A) an aromatic polycarbonate resin having a weight average molecular weight of from 13,000 to 18,000, wherein the aromatic polycarbonate resin (A) is produced by subjecting an aromatic dihydroxy compound and a carbonic diester to a transesterification reaction, and is substantially free of a chlorine atom, and (B) a partial ester obtained from a saturated aliphatic carboxylic acid having 10 to 30 carbon atoms and a dito hexahydric alcohol, the partial ester (B) having an acid value of from 2 to 20 mgKOH. Use of the polycarbonate resin composition of the present invention in the production of a substrate for an optical information medium is advantageous in that a substrate (for an optical information medium) which has high mechanical strength and in which the occurrence of a "cloud" (i.e., haze) is suppressed, can be produced by the so-called "high-cycle molding" (i.e., the molding can be performed with a short cycle time). Therefore, the polycarbonate resin composition of the present invention can be very advantageously used in the production of a substrate for an optical information medium, such as an optical disc (e.g., a CD or a DVD).

2. Prior Art

Polycarbonates have been widely used in various fields as engineering plastics having excellent properties with respect to heat resistance, impact resistance and transparency. Especially, due to the recent rapid progress of information technology, there has been a growing demand for polycarbonates for producing storage media for music and images, and storage media for digital information (such as a storage medium for a personal computer). Nowadays, polycarbonates have become indispensable resins for producing optical discs and optical cards, such as a CD, a CD-ROM, a CD-R, a DVD-ROM and a DVD-R.

In the production of a substrate for an optical information medium, such as an optical disc, formation of precise microgrooves and micropits on the substrate is necessary. Polycarbonates for use in the production of such a substrate need to have high transferability and excellent optical properties, such as low birefringence. Therefore, low molecular weight polycarbonates having a weight average molecular weight of about 15,500 and having a high melt fluidity have hitherto been used in the production of the substrates for the optical information media.

In the production of the substrates for the optical information media, polycarbonates produced by the phosgene process have conventionally been used. However, the use of the polycarbonates produced by the phosgene process in the production of the substrates for the optical information media is accompanied by the following problems: (1) phosgene used in this process is toxic and thus difficult to handle; (2) methylene chloride used as a solvent in this process causes polycarbonates to contain impurities (chlorine ions and residual methylene chloride) which not only adversely affect the thermal stability of the polycarbonates during the molding, but also causes corrosion of a mold used for the molding of the polycarbonates; and the quality of the produced substrate for the optical information medium becomes poor under a moist heat environment. In order to alleviate these problems accompanying the phosgene process polycarbonates, various proposals for polycarbonate compositions containing decreased amounts of the above-mentioned impurities and methods for decreasing the amounts of the impurities contained in the polycarbonates have been made in a number of documents, including Unexamined Japanese Patent Application Laid-Open Specification No. Sho 63-316313 (corresponding to U.S. Pat. No. 4,880,896), Unexamined Japanese Patent Application Laid-Open Specification No. Hei 4-146922, and Unexamined Japanese Patent Application Laid-Open Specification No. Sho 63-97627 (corresponding to U.S. Pat. No. 4,798,767).

However, these methods pose problems in that the impurities (chlorine ions and residual methylene chloride) cannot be completely removed from polycarbonates and that the removal of impurities from polycarbonates requires a great deal of labor. Therefore, polycarbonates produced by the transesterification process, which uses no phosgene or methylene chloride, have recently been drawing attention.

However, the transesterification polycarbonates have the following problems. When a substrate for an optical information medium (hereinafter frequently referred to as a "disc") is produced from a transesterification polycarbonate, the substrate produced exhibits poor properties, as compared to the properties of a substrate produced from a phosgene process polycarbonate. Specifically, when a disc is produced from a transesterification polycarbonate, problems occur not only in that the disc produced exhibits low mechanical strength, but also in that marked occurrence of a cloud (i.e., haze) is encountered during the molding, thus rendering it impossible to obtain an excellent substrate for an optical information medium. Further, the transesterification polycarbonates have a defect in that, when an attempt is made to shorten the time of molding cycle in order to improve the productivity of the disc (i.e., when a disc is produced by the "high-cycle molding"), the occurrence of a cloud is likely to be more vigorous. Therefore, it has been desired to improve the transesterification polycarbonates with respect to these properties.

It is well known that the mechanical strength of a disc can be improved by using a polycarbonate having an increased molecular weight. However, this method poses a problem in that the transferability of the polycarbonate with respect to the microgrooves and micropits on the disc becomes lowered or the birefringence of the disc is increased. Therefore, such method is not employed in the art.

On the other hand, with respect to a cloud (i.e., haze), it is considered that a cloud is caused by poor mold release of a disc in the molding process. Therefore, there have been made various proposals on mold release agents.

For example, in an attempt to improve the transferability of the polycarbonate, Unexamined Japanese Patent Application Laid-Open Specification No. Sho 60-113201 proposes a molded article for optical use, comprising a polycarbonate composition containing 0.01 to 0.2 part by weight, relative to 100 parts by weight of the polycarbonate, of a monoglyceride of a saturated aliphatic monoacid having 16 to 22 carbon atoms. It is considered that the monoglyceride used in this patent document is a commercially available product. In this connection, it should be noted that, as described below, the acid value of a commercially available monoglyceride of an aliphatic acid is approximately 1 mgKOH. Therefore, the acid value of the monoglyceride used in this patent document does not fall in the acid value range (of from 2 to 20 mgKOH) prescribed for the partial ester used in the present invention.

On the other hand, in an attempt to ensure good mold release properties of the polycarbonate and suppress the occurrence of hydrolysis of the polycarbonate, Unexamined Japanese Patent Application Laid-Open Specification No. Hei 7-169092 proposes a substrate for an optical information medium, comprising a polycarbonate composition containing a mold release agent which is comprised of a $C_{10}$-$C_{30}$ aliphatic acid ester (e.g., glycerol monostearate) and which has a pH value of 7 or less, wherein the mold release agent is present in an amount of 0.5% by weight or less, based on the weight of the polycarbonate composition. In this patent document, it is preferred that the aliphatic acid ester used therein has a pH value of from 4.0 to 6.5. On the other hand, as described below, when the acid value of the partial ester used in the present invention (which is in the range of from 2 to 20 mgKOH) is expressed in terms of a pH value which is obtained by taking into consideration the operation conditions as described in this patent document, the pH value in the range of from about 1.75 to about 2.75 is obtained. Therefore, the acid value of the partial ester used in this patent document does not fall in the acid value range (of from 2 to 20 mgKOH) prescribed for the partial ester used in the present invention.

In an attempt to improve the mold release properties, thermal resistance and transferability of the polycarbonate, Unexamined Japanese Patent Application Laid-Open Specification No. Hei 8-73724 proposes a composition comprising 100 parts by weight of an aromatic polycarbonate resin having a terminal hydroxyl content of from 2 to 40 mole % and a molecular weight distribution (Mw/Mn) of from 2.0 to 2.8 as measured by gel permeation chromatography, and 0.01 to 0.1 part by weight of a partial ester obtained from an aliphatic carboxylic acid and a polyhydric alcohol. It is considered that the partial ester used in this patent document is a commercially available product. In this connection, it should be noted that, as described below, the acid value of a commercially available partial ester is approximately 1 mgKOH. Therefore, the acid value of the partial ester used in this patent document does not fall in the acid value range (of from 2 to 20 mgKOH) prescribed for the partial ester used in the present invention.

These conventional techniques have not yet satisfactorily solved the above-mentioned problems accompanying the polycarbonates and, hence, it has been desired to improve the conventional techniques. That is, it has been desired to develop a molding material which comprises a polycarbonate resin produced by the transesterification process and which is advantageous not only in that it can be used in the production of an excellent substrate for an optical information medium, the substrate exhibiting high mechanical strength and suppression of occurrence of a cloud (i.e., haze), but also in that the molding material exhibits excellent suitability for high-cycle molding (i.e., excellent aptitude for being molded with a short cycle time).

SUMMARY OF THE INVENTION

In this situation, the present inventors have made extensive and intensive studies with a view toward solving the above-mentioned problems accompanying the prior art which uses a transesterification polycarbonate resin in the production of a substrate for an optical information medium. As a result, first, it has been found that those problems cannot be solved simply by adding, to a transesterification polycarbonate resin, a conventional partial ester obtained from a saturated aliphatic carboxylic acid and a polyhydric alcohol, wherein the partial ester is now widely used as a mold release agent. Further intensive studies have revealed that, in the production of a substrate for an optical information medium, it is very advantageous to use a polycarbonate resin composition comprising a polycarbonate resin produced by the transesterification process and a partial ester obtained from a saturated aliphatic carboxylic acid having 10 to 30 carbon atoms and a di- to hexahydric alcohol, wherein the partial ester has an acid value of from 2 to 20 mgKOH. Specifically, this polycarbonate resin composition is advantageous not only in that the substrate produced exhibits a greatly improved mechanical strength and remarkable suppression of occurrence of a cloud (i.e., haze), but also in that the polycarbonate resin composition exhibits excellent suitability for high-cycle molding (i.e., excellent aptitude for being molded with a short cycle time). Thus, it has unexpectedly been found that, by the use of such polycarbonate resin composition in the production of a substrate for an optical information medium, the above-mentioned problems can be solved. Based on these findings, the present invention has been completed.

Accordingly, it is a primary object of the present invention to provide a polycarbonate resin composition which is advantageous not only in that it can be used in the production of an excellent substrate for an optical information medium, such as an optical disc (e.g., a CD or a DVD), the substrate exhibiting high mechanical strength and remarkable suppression of occurrence of a cloud (i.e., haze), but also in that the resin composition exhibits excellent suitability for high-cycle molding (i.e., excellent aptitude for being molded with a short cycle time).

The foregoing and other objects, features and advantages of the present invention will be apparent from the following detailed description and appended claims.

DETAILED DESCRIPTION OF THE INVENTION

According to the present invention, there is provided a polycarbonate resin composition for use in the production of a substrate for an optical information medium, comprising:

100 parts by weight of (A) an aromatic polycarbonate resin having a weight average molecular weight of from 13,000 to 18,000, wherein the aromatic polycarbonate resin (A) is produced by subjecting an aromatic dihydroxy compound and a carbonic diester to a transesterification reaction, and is substantially free of a chlorine atom, and 0.01 to 0.1 part by weight of (B) a partial ester obtained from a saturated aliphatic carboxylic acid having 10 to 30 carbon atoms and a di- to hexahydric alcohol, the partial ester (B) having an acid value of from 2 to 20 mgKOH.

For easy understanding of the present invention, the essential features and various preferred embodiments of the present invention are enumerated below.

1. A polycarbonate resin composition for use in the production of a substrate for an optical information medium, comprising:

100 parts by weight of (A) an aromatic polycarbonate resin having a weight average molecular weight of from 13,000 to 18,000, wherein the aromatic polycarbonate resin (A) is produced by subjecting an aromatic dihydroxy compound and a carbonic diester to a transesterification reaction, and is substantially free of a chlorine atom, and 0.01 to 0.1 part by weight of (B) a partial ester obtained from a saturated aliphatic carboxylic acid having 10 to 30 carbon atoms and a di- to hexahydric alcohol, the partial ester (B) having an acid value of from 2 to 20 mgKOH.

2. The polycarbonate resin composition according to item 1 above, wherein the aromatic polycarbonate resin (A) comprises a plurality of aromatic polycarbonate main chains, each comprising recurring units each independently represented by the following formula (1):

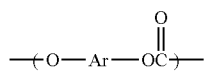
(1)

wherein Ar represents a divalent $C_5$-$C_{200}$ aromatic group, wherein the plurality of aromatic polycarbonate main chains collectively contain therein at least one heterounit, the heterounit being represented by the following formula (2):

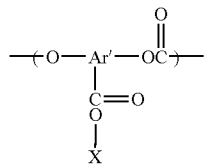
(2)

wherein Ar' represents a trivalent $C_5$-$C_{200}$ aromatic group, and X represents a polycarbonate chain having recurring units each represented by the formula

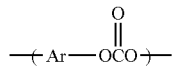

wherein
Ar is as defined above and having a molecular weight of from 214 to 6,000, and wherein, when the polycarbonate main chains contain a plurality of heterounits, the heterounits are the same or different, the amount of the heterounit (2) being from 0.03 to 0.20 mole %, based on the total molar amount of the recurring units (1).

3. The polycarbonate resin composition according to item 1 or 2 above, wherein the partial ester (B) is at least one member selected from the group consisting of glycerol monostearate and glycerol monopalmitate.

4. The polycarbonate resin composition according to item 1 or 2 above, which is a substrate for an optical information medium, the substrate being produced by injection molding.

Hereinbelow, the present invention is described in detail.

The polycarbonate resin composition of the present invention for use in the production of a substrate for an optical information medium, is a composition comprising:

100 parts by weight of (A) an aromatic polycarbonate resin having a weight average molecular weight of from 13,000 to 18,000, wherein the aromatic polycarbonate resin (A) is produced by subjecting an aromatic dihydroxy compound and a carbonic diester to a transesterification reaction, and is substantially free of a chlorine atom, and 0.01 to 0.1 part by weight of (B) a partial ester obtained from a saturated aliphatic carboxylic acid having 10 to 30 carbon atoms and a di- to hexahydric alcohol, the partial ester (B) having an acid value of from 2 to 20 mgKOH.

In the present invention, the term "aromatic dihydroxy compound" means a compound represented by the formula:

wherein Ar represents a divalent $C_5$-$C_{200}$ aromatic group.

A specific example of aromatic group Ar is a divalent aromatic group represented by the formula: —$Ar^1$—Y—$Ar^2$—, wherein each of $Ar^1$ and $Ar^2$ independently represents a divalent $C_5$-$C_{70}$ carbocyclic or heterocyclic aromatic group, and Y represents a divalent $C_1$-$C_{30}$ alkane group.

In divalent aromatic groups $Ar^1$ and $Ar^2$, at least one hydrogen atom thereof may be replaced by a substituent which does not adversely affect the transesterification reaction for producing a polycarbonate resin, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group or a nitro group.

Preferred examples of heterocyclic aromatic groups include an aromatic group having in a skeleton thereof at least one hetero atom, such as a nitrogen atom, an oxygen atom or a sulfur atom.

Examples of divalent aromatic groups $Ar^1$ and $Ar^2$ include an unsubstituted or substituted phenylene group, an unsubstituted or substituted biphenylene group and an unsubstituted or substituted pyridylene group. Substituents for $Ar^1$ and $Ar^2$ are as described above.

Examples of divalent alkane groups Y include or ganic groups respectively represented by the following formulae:

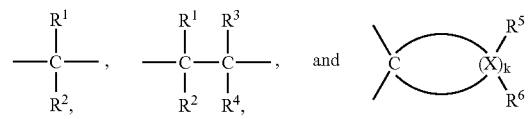

wherein each of $R^1$, $R^2$, $R^3$ and $R^4$ independently represents a hydrogen atom, an alkyl group having from 1 to 10 carbon atoms, an alkoxy group having from 1 to 10 carbon atoms, a cycloalkyl group having from 5 to 10 ring-forming carbon atoms, a carbocyclic aromatic group having from 5 to 10 ring-forming carbon atoms or a carbocyclic aralkyl group having from 6 to 10 ring-forming carbon atoms; k represents an integer of from 3 to 11; each X represents a carbon atom and has $R^5$ and $R^6$ bonded thereto; each $R^5$ independently represents a hydrogen atom or an alkyl group having from 1 to 6 carbon atoms, and each $R^6$ independently represents a hydrogen atom or an alkyl group having from 1 to 6 carbon atoms; and wherein at least one hydrogen atom of each of $R^1$, $R^2$, $R^3$, $R^4$, $R^5$ and $R^6$ may be independently replaced by a substituent which does not adversely affect the transesterification reaction for producing a polycarbonate resin, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group or a nitro group.

Specific examples of divalent aromatic groups Ar which are represented by the above-mentioned formula: $Ar^1$—Y—$Ar^2$— include groups respectively represented by the following formulae:

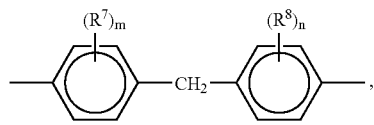

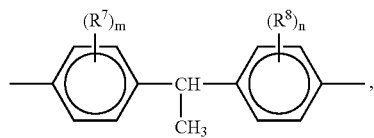

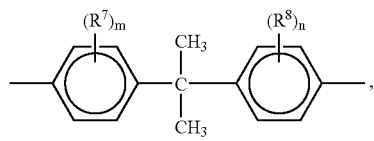

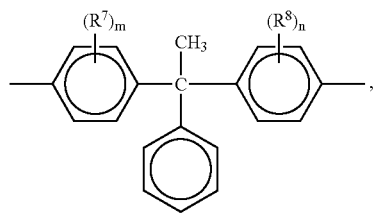

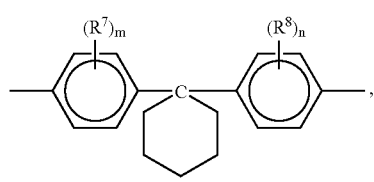

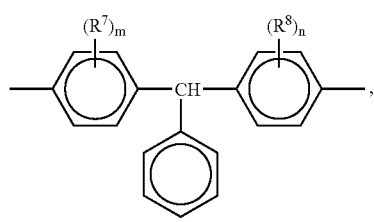

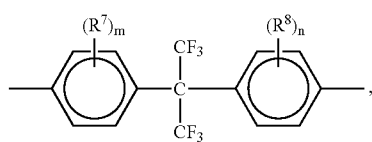

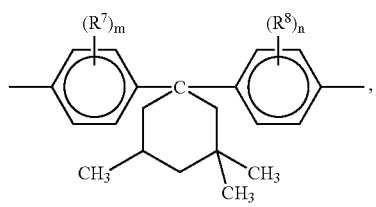

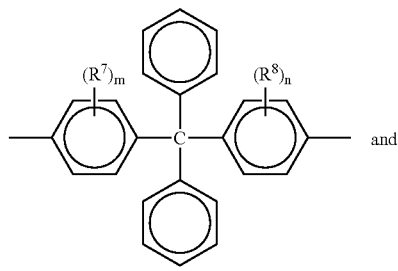

and

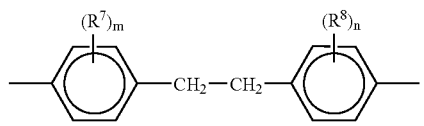

wherein each of substituent $R^7$ and substituent $R^8$ independently represents a halogen atom, an alkyl group having from 1 to 10 carbon atoms, an alkoxy group having from 1 to 10 carbon atoms, a cycloalkyl group having from 5 to 10 ring-forming carbon atoms, or a phenyl group; each of m and n independently represents an integer of from 0 to 4, with the proviso that when m is an integer of from 2 to 4, the $R^7$'s are the same or different, and when n is an integer of from 2 to 4, the $R^8$'s are the same or different.

Further examples of divalent aromatic groups Ar include those which are represented by the following formula:

—$Ar^1$-Z-$Ar^2$— wherein $Ar^1$ and $Ar^2$ are as defined above; and Z represents a single bond or a divalent group, such as —O—, —CO—, —S—, —$SO_2$—, —SO—, —COO—, and —CON($R^1$)—, wherein $R^1$ is as defined above.

Specific examples of divalent aromatic groups Ar which are represented by the above-mentioned formula: $Ar^1$-Z-$Ar^2$— include groups respectively represented by the following formulae:

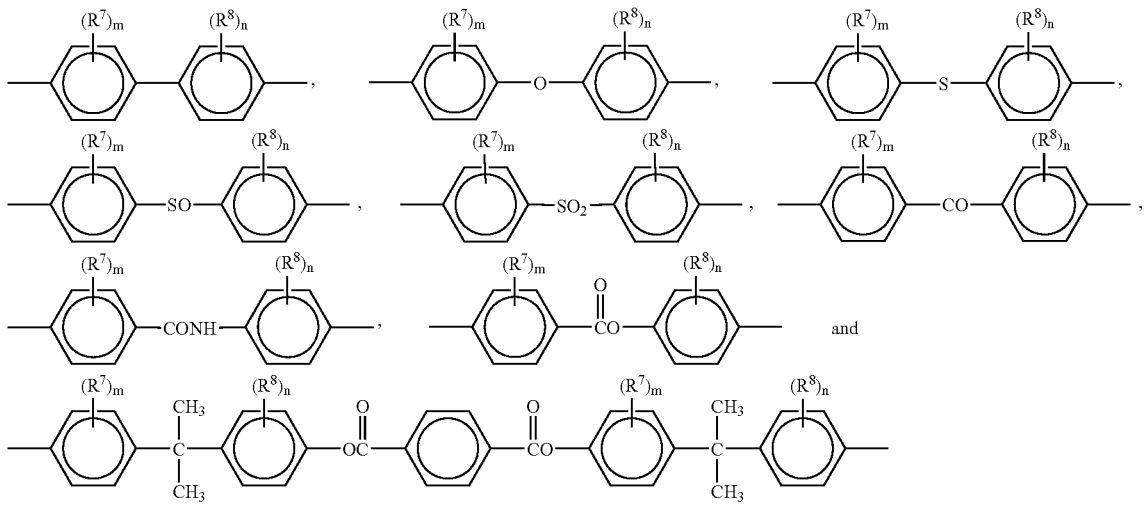

wherein $R^7$, $R^8$, m and n are as defined above.

Further specific examples of divalent aromatic groups Ar include an unsubstituted or substituted phenylene group, an unsubstituted or substituted naphthylene group, an unsubstituted or substituted biphenylene group and an unsubstituted or substituted pyridylene group.

In the present invention, aromatic dihydroxy compounds may be used individually or in combination. As a representative example of aromatic dihydroxy compounds, there can be mentioned bisphenol A.

The carbonic diester used in the present invention is represented by the following formula:

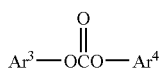

wherein each of $Ar^3$ and $Ar^4$ represents a monovalent $C_5$-$C_{200}$ aromatic group.

In each of $Ar^3$ and $Ar^4$, which independently represents a monovalent carbocyclic or heterocyclic aromatic group, at least one hydrogen atom may be replaced by a substituent which does not adversely affect the transesterification reaction for producing the polycarbonate resin, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group or a nitro group. $Ar^3$ and $Ar^4$ may be the same or different.

Representative examples of monovalent aromatic groups $Ar^3$ and $Ar^4$ include a phenyl group, a naphthyl group, a biphenyl group and a pyridyl group. These groups may or may not be substituted with the abovementioned substituent or substituents.

Preferred examples of monovalent aromatic groups $Ar^3$ and $Ar^4$ include those which are represented by the following formulae:

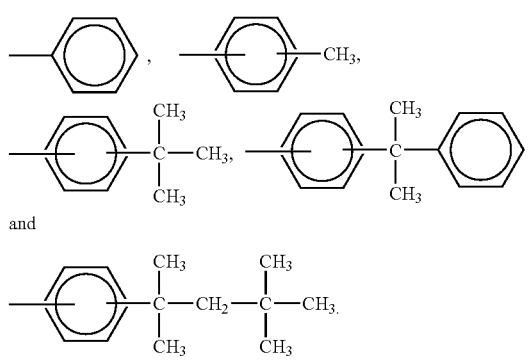

Representative examples of carbonic diesters include di(unsubstituted or substituted)aryl carbonate compounds represented by the following formula:

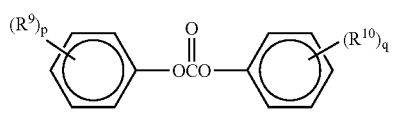

wherein each of $R^9$ and $R^{10}$ independently represents a hydrogen atom, an alkyl group having from 1 to 10 carbon atoms, an alkoxy group having from 1 to 10 carbon atoms, a cycloalkyl group having from 5 to 10 ring-forming carbon atoms or a phenyl group; each of p and q independently represents an integer of from 1 to 5, with the proviso that when p is an integer of 2 or more, the $R^9$'s are the same or different, and when q is an integer of 2 or more, the $R^{10}$'s are the same or different.

Of these diaryl carbonate compounds, preferred are those having a symmetrical configuration, for example, di(unsubstituted)phenyl carbonate and di(lower alkylsubstituted)phenyl carbonates, e.g., ditolyl carbonate and di-t-butylphenyl carbonate. Especially preferred is di(unsubstituted)phenyl carbonate, which has the simplest structure. These carbonic diesters may be used individually or in combination.

In the production of the polycarbonate resin (A), the ratio (i.e., a charging ratio) of the aromatic dihydroxy compound to the carbonic diester varies depending on the types of the aromatic dihydroxy compound and carbonic diester employed and other polymerization conditions, e.g., the reaction temperature. The carbonic diester is generally used in an amount of from 0.9 to 2.5 moles, preferably from 0.95 to 2.0 moles, more preferably from 0.98 to 1.5 moles, per mole of the aromatic dihydroxy compound.

In the production of the polycarbonate resin (A), an aromatic monohydroxy compound may be used for changing the terminal groups, or adjusting the molecular weight of the polycarbonate resin (A).

In the present invention, the production of a polycarbonate resin is conducted by a transesterification process which is a process wherein a condensation polymerization of the aromatic dihydroxy compound and the carbonic diester is performed by transesterification in the molten state while heating in the presence or absence of a catalyst under reduced pressure and/or under an inert gas flow. The mode of the transesterification process, the polymerization equipment and the like are not specifically limited. Examples of reactors employable for performing the transesterification reaction include an agitation type reactor vessel, a wiped film type reactor, a centrifugal wiped film evaporation type reactor, a surface renewal type twin-screw kneading reactor, a twin-screw horizontal agitation type reactor, a wall-wetting fall reactor, a free-fall polymerizer having a perforated plate, and a guide-wetting fall polymerizer having a perforated plate and at least one guide (e.g., a wire) provided in association with the perforated plate (e.g., a wire-wetting fall reactor having a perforated plate). The transesterification reaction can be easily performed using these various types of reactors individually or in combination. Further, the production of the polycarbonate resin (A) can also be performed by the solid-state polymerization process, in which a molten-state transesterification process is first conducted to obtain a prepolymer, and the obtained prepolymer is then subjected to a solid-state polymerization under reduced pressure and/or under an inert gas flow, thereby increasing the polymerization degree of the prepolymer. With respect to the free-fall polymerizer having a perforated plate, reference can be made, for example, to U.S. Pat. No. 5,596,067. With respect to the guide-wetting fall polymerizer, reference can be made, for example, to U.S. Pat. Nos. 5,589,564 and 5,840,826. With respect to materials for constructing these polymerizers used in the present invention, there is no particular limitation. However, stainless steel, nickel or glass is generally used as a material for at least inner wall portions of polymerizers.

A transesterification reaction can be carried out in the absence of a catalyst. However, if it is desired to accelerate the polymerization, the polymerization can be effected in the presence of a catalyst. The polymerization catalysts which are customarily used in the art can be used without particular limitation. Examples of such catalysts include hydroxides of an alkali metal and of an alkaline earth metal, such as lithium hydroxide, sodium hydroxide, potassium hydroxide and calcium hydroxide;

alkali metal salts of, alkaline earth metal salts of and quaternary ammonium salts of boron hydride and aluminum hydride, such as lithium aluminum hydride, sodium boron hydride and tetramethyl ammonium boron hydride; hydrides of an alkali metal and of an alkaline earth metal, such as lithium hydride, sodium hydride and calcium hydride;

alkoxides of an alkali metal and of an alkaline earth metal, such as lithium methoxide, sodium ethoxide and calcium methoxide;

aryloxides of an alkali metal and of an alkaline earth metal, such as lithium phenoxide, sodium phenoxide, magnesium phenoxide, LiO—Ar—OLi wherein Ar represents an arylene group, and NaO—Ar—ONa wherein Ar is as defined above; organic acid salts of an alkali metal and of an alkaline earth metal, such as lithium acetate, calcium acetate and sodium benzoate; zinc compounds, such as zinc oxide, zinc acetate and zinc phenoxide; boron compounds, such as boron oxide, boric acid, sodium borate, trimethyl borate, tributyl borate, triphenyl borate, ammonium borates represented by the formula: $(R^1 R^2 R^3 R^4)NB(R^1 R^2 R^3 R^4)$, and phosphonium borates represented by the formula: $(R^1, R^2, R^3, R^4)PB(R^1 R^2 R^3 R^4)$, wherein $R^1$, $R^2$, $R^3$ and $R^4$ are as defined above;

silicon compounds, such as silicon oxide, sodium silicate, tetraalkylsilicon, tetraarylsilicon and diphenyl-ethyl-ethoxy-silicon; germanium compounds, such as germanium oxide, germanium tetrachloride, germanium ethoxide and germanium phenoxide; tin compounds, such as tin oxide, dialkyltin oxide, dialkyltin carboxylate, tin acetate, tin compounds having an alkoxy group or aryloxy group bonded to tin, such as ethyltin tributoxide, and organotin compounds; lead compounds, such as lead oxide, lead acetate, lead carbonate, basic lead carbonate, and alkoxides and aryloxides of lead or organolead;

onium compounds, such as a quaternary ammonium salt, a quaternary phosphonium salt and a quaternary arsonium salt; antimony compounds, such as antimony oxide and antimony acetate; manganese compounds, such as manganese acetate, manganese carbonate and manganese borate; titanium compounds, such as titanium oxide and titanium alkoxides and titanium aryloxide; and zirconium compounds, such as zirconium acetate, zirconium oxide, zirconium alkoxide, zirconium aryloxide and zirconium acetylacetone.

The catalysts can be used individually or in combination. The amount of the catalyst used is generally in the range of from $10^{-8}$ to 1 part by weight, preferably from $10^{-7}$ to $10^{-1}$ part by weight, relative to 100 parts by weight of the aromatic dihydroxy compound.

The polycarbonate resin (A) used in the present invention has a weight average molecular weight of from 13,000 to 18,000, preferably from 13,500 to 17,000, more preferably from 14,000 to 16,000. When the weight average molecular weight is larger than the abovementioned range, the melt fluidity of the polycarbonate resin becomes unsatisfactory, so that the polycarbonate resin cannot be used for producing a substrate for an optical information medium having a high recording density, such as a DVD. When the weight average molecular weight is smaller than the above-mentioned range, the mechanical strength of the substrate produced becomes unsatisfactory.

In the present invention, the weight average molecular weight of the polycarbonate resin can be measured by gel permeation chromatography (GPC) using TOSOH TSK-GEL column Nos. G5000HXL/G4000HXL/G4000HXL (each manufactured and sold by Tosoh Corporation, Japan), tetrahydrofuran (as a solvent) and a polystyrene gel column. As a calibration curve, a modified calibration curve for a polycarbonate is used, which is obtained by modifying a calibration curve obtained with respect to standard monodisperse polystyrene samples, wherein the modification of the calibration curve is made by a calculation using the following formula:

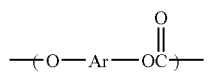

wherein $M_{pc}$ represents the molecular weight of the polycarbonate resin, and $M_{ps}$ represents the molecular weight of the standard polystyrene.

In the polycarbonate resin composition of the present invention, it is preferred that the aromatic polycarbonate resin (A) comprises a plurality of aromatic polycarbonate main chains, each comprising recurring units each independently represented by the following formula (1):

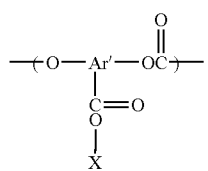

wherein Ar represents a divalent $C_5$-$C_{200}$ aromatic group, wherein the plurality of aromatic polycarbonate main chains collectively contain therein at least one heterounit, the heterounit being represented by the following formula (2):

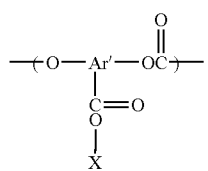

wherein Ar' represents a trivalent $C_5$-$C_{200}$ aromatic group, and X represents a polycarbonate chain having recurring units each represented by the formula

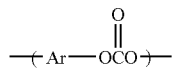

wherein

Ar is as defined above and having a molecular weight of from 214 to 6,000, and wherein, when the polycarbonate main chains contain a plurality of heterounits, the heterounits are the same or different, the amount of the heterounit (2) being from 0.03 to 0.20 mole %, based on the total molar amount of the recurring units (1).

When bisphenol A is employed as an aromatic dihydroxy compound, a specific example of heterounit (2) is a unit represented by the following formula (2'):

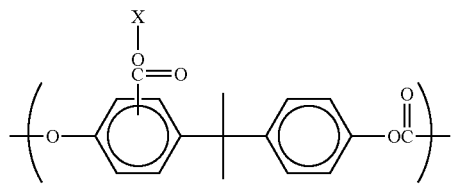

When the amount of the heterounit (2) is less than 0.03 mole %, based on the total molar amount of the recurring units (1), the transferability of the resin composition tends to become unsatisfactory. On the other hand, when the amount of the heterounit (2) is more than 0.20 mole %, based on the total molar amount of the recurring units (1), occurrence of a cloud tends to be caused and the mechanical strength of the produced substrate tends to become unsatisfactory. In the present invention, the amount of the heterounit (2) is more preferably in the range of from 0.04 to 0.18 mole %, still more preferably in the range of from 0.05 to 0.15 mole %, based on the total molar amount of the recurring units (1).

In the present invention, the determination of each of recurring units (1) and heterounits (2) can be conducted, for example, by a method in which the polycarbonate resin is completely hydrolyzed, and the resultant hydrolysis mixture is analyzed by reversed phase liquid chromatography (the analysis by reversed phase liquid chromatography can be conducted under the conditions as described below in the Examples). With respect to the hydrolysis of the polycarbonate resin, it is preferred that the hydrolysis is conducted at room temperature by the method described in "Polymer Degradation and Stability" 45 (1994), 127-137. The hydrolysis by this method is advantageous in that the complete hydrolysis of a polycarbonate resin can be achieved by simple operation without the danger of occurrence of side reactions during the hydrolysis. In the present invention, the hydrolysis of the polycarbonate resin is conducted at room temperature (25° C.).

As an illustrative example of the method for introducing heterounits (2) into the polycarbonate main chains in the production of the aromatic polycarbonate resin used in the present invention by transesterification process, there can be mentioned a first method in which, as generally practiced in the art, heterounits (2) are introduced into the polycarbonate main chains by using a specific aromatic dihydroxy compound having a carboxyl group, which, when subjected to a transesterification reaction with a carbonic diester, forms the heterounits (2), to thereby introduce a branched structure. Alternatively, the polycarbonate resin used in the present invention can be produced without using the above-mentioned specific compound, specifically, by a second method in which recurring units (1) of the polycarbonate main chains are converted so as to form and contain therein the heterounits during the polymerization process by choosing appropriate polymerization conditions, such as polymerization temperature, type of catalyst, and residence time. The abovementioned two methods can be used in combination.

In the present invention, it is preferred to use the above-mentioned second method, since this method enables easy production of a polycarbonate resin which is useful for preparing a resin composition which is advantageous not only in that it exhibits substantial freedom from the occurrence of optical defects when the disc produced from the composition is subjected to a test of resistance to moist heat, but also in that the composition exhibits an excellent balance of the mechanical properties of the disc produced from the composition and the moldability of the composition. With respect to the above-mentioned test of resistance to moist heat, the test can be performed by, for example, the following method.

Three disc-shaped substrates (each having a thickness of 0.6 mm) for an optical disc, e.g., a substrate for a DVD-R (hereinafter, frequently referred to simply as an "optical disc substrate") are produced by subjecting a polycarbonate resin composition to an injection molding, using an injection molding machine for producing optical discs (J35EL II-DK, manufactured and sold by THE JAPAN STEEL WORKS. LTD., Japan), at a molding temperature of 370° C., and a mold temperature of 120° C. The thus obtained optical disc substrates are subjected to, for example, sputtering and formation of a photosensitive layer, thereby obtaining three optical discs. The thus obtained three optical discs are allowed to stand at 90° C. under a relative humidity of 90% for 150 hours. The optical discs are then observed through a magnifying lens to see whether or not the discs have a craze-like optical defect having a diameter of 200 μm or more. The evaluation of the resistance to moist heat is made in accordance with the following criteria.

○: Optical defect is not observed.
  x: Optical defect is observed.

Further, after the evaluation of the resistance to moist heat, there can also be performed a test for the degree of the occurrence of errors in recording and reading with a laser beam, by using a testing device for evaluating the performance of an optical disc in recording and reading with a laser beam, to thereby evaluate the performance of the discs as optical information media.

It is generally known in the art that, during the production of a polycarbonate resin by transesterification reaction, bisphenol A used as an aromatic dihydroxy compound undergoes a reaction similar to the Kolbe-Schmitt reaction under the influence of an alkali (which is used as a catalyst) to thereby form a heterounit represented by the following formula (α):

The amount of the terminal hydroxyl groups is more preferably from 10 to 40 mole %, most preferably from 15 to 30 mole %, based on the total molar amount of the terminal groups of the polycarbonate resin. In general, the ratio of the terminal hydroxyl groups can be determined by a method in which the ratio of the terminal hydroxyl groups is directly measured by NMR or a method in which the ratio of the terminal hydroxyl groups is calculated from the molar amount of the terminal hydroxyl groups and the total molar amount of the terminal groups, which are measured by titanium method, UV method, or IR method.

The resin composition of the present invention can be produced by adding, to 100 parts by weight of (A) an aromatic polycarbonate resin, 0.01 to 0.1 part by weight of (B) a partial ester obtained from a saturated aliphatic carboxylic acid having 10 to 30 carbon atoms and a di- to hexahydric alcohol, wherein the partial ester (B) has an acid value of from 2 to 20 mgKOH. The amount of the partial ester (B) is preferably in the range of from 0.015 to 0.08 part by weight, more preferably from 0.02 to 0.06 part by weight. When the amount of the partial ester (B) is not in the range of from 0.01 to 0.1 part by weight, problems arise in that the substrate for an optical information medium produced from the resin composition is likely to exhibit poor mechanical strength and marked occurrence of a cloud. Further, it is preferred that the partial ester (B) used in the polycarbonate resin composition of the present invention has an acid value of from 4 to 18 mgKOH, more advantageously from 5 to 15

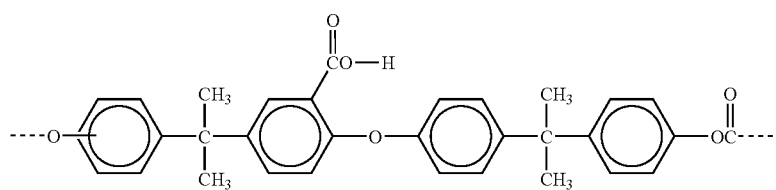

(α)

However, by regulating the reaction conditions, desired amounts of heterounit represented by the formula (2) can be introduced into the polycarbonate main chains, while almost completely suppressing the formation of heterounit (α).

With respect to the above-mentioned second method for producing the polycarbonate resin used in the present invention wherein the polycarbonate resin has polycarbonate main chains in which the heterounits (2) are introduced by controlling the reaction conditions, there is no particular limitation. However, it is preferred to use the method described in International Application Publication No. WO97/32916. Further, if desired, the polycarbonate resin used in the present invention may have a structure in which heterounits other than the heterounits (2) are introduced into the polycarbonate main chains by using a multifunctional compound. Examples of multifunctional compounds include those described in the U.S. 2002/0183428 A1, which are compounds each having three or more functional groups selected from the group consisting of a phenolic hydroxyl group and a carboxyl group.

Generally, transesterification polycarbonate resins tend to have a high ratio of terminal hydroxyl groups in all terminal groups. In the present invention, it is preferred that the polycarbonate resin has terminal hydroxyl groups in an amount of from 5 to 50 mole %, based on the total molar amount of the terminal groups of the polycarbonate resin.

mgKOH. When the acid value of the partial ester (B) is not in the range of from 2 to 20 mgKOH, problems arise in that the substrate for an optical information medium produced from the resin composition is likely to exhibit poor mechanical strength and marked occurrence of a cloud.

With respect to the saturated aliphatic carboxylic acid used to form the partial ester (B), it is preferred that the saturated aliphatic carboxylic acid has 10 to 25 carbon atoms, more advantageously 12 to 22 carbon atoms.

In the present invention, a di- to hexahydric alcohol is used as a polyhydric alcohol for forming the partial ester (B). Preferred examples of di- to hexahydric alcohols include ethylene glycol, glycerol, trimethylolpropane and pentaerythritol. Of these, especially preferred is glycerol. Preferred examples of saturated aliphatic carboxylic acids having 10 to 30 carbon atoms include palmitic acid, stearic acid, eicosanoic acid and behenic acid. Of these, especially preferred are palmitic acid and stearic acid. These saturated aliphatic carboxylic acids can be used individually or in combination.

With respect to the partial ester (B) obtained from the saturated aliphatic carboxylic acid and the di- to hexahydric alcohol, there is no particular limitation, so long as the partial ester has an acid value of from 2 to 20 mgKOH. However, it is preferred that the partial ester (B) is a monoester. More specifically, it is preferred that the partial ester (B) is at least one member selected from the group consisting of glycerol monostearate, glycerol monopalmitate and pentaerythritol monostearate. It is more preferred that the partial ester (B) is at least one member selected from the group consisting of glycerol monostearate and glycerol monopalmitate.

The acid value (mgKOH) of a partial ester can be measured by the following method. 100 ml of isopropanol is added to 2.5 g of a partial ester to thereby dissolve the partial ester. To the resultant solution is added phenolphthalein as an indicator. The resultant mixture is subjected to titration using a 0.1 mol/L standard solution of potassium hydroxide, to thereby obtain the acid value (mgKOH) of the partial ester. In the measurement of the acid value, when it is expected that the partial ester has an acid value of 1 or less, the amount of the partial ester subjected to measurement is changed to 20 g; when it is expected that the partial ester has an acid value of from 1 to 4, the amount of the partial ester subjected to measurement is changed to 10 g; and when it is expected that the partial ester has an acid value of 15 or more, the amount of the partial ester subjected to measurement is changed to 0.5 g.

Hereinbelow, an explanation is made on the method for producing the partial ester (B) used in the present invention. The partial ester (B) has an acid value of from 2 to 20 mgKOH. Various partial esters obtained from a saturated aliphatic carboxylic acid having 10 to 30 carbon atoms and a di- to hexahydric alcohol, are commercially available. However, in the case of partial esters (e.g., monoglyceride of a fatty acid) produced by a conventional method, including commercially available partial esters, the acid value thereof is approximately 1 mgKOH. Therefore, when a partial ester produced by a conventional method or a commercially available partial ester is used in the production of the resin composition of the present invention, it is required that, prior to use, the acid value of a partial ester be increased, by the below-described method, to a value in the desired range (of from 2 to 20 mgKOH).

With respect to the method for producing a partial ester having an acid value of from 2 to 20 mgKOH, there is no particular limitation. Such partial ester can be produced, for example, by a method comprising the following two steps:
(1) providing a partial ester having an acid value of less than 2 mgKOH, and
(2) increasing the acid value of the partial ester provided in step (1) above to a value in the desired range, to thereby obtain the desired partial ester.

In step (1) above, a partial ester having an acid value of less than 2 mgKOH is provided. In general, commercially available partial esters, such as a commercially available monoglyceride of a fatty acid, have an acid value of approximately 1 mgKOH. Therefore, such commercially available partial esters can be provided in step (1). Alternatively, a partial ester having an acid value of less than 2 mgKOH can be produced by a conventional method. Hereinbelow, the method for producing a partial ester having an acid value of less than 2 mgKOH is explained, taking as examples the cases where partial esters produced are 1-monoglyceride of a fatty acid and 2-monoglyceride of a fatty acid. (With respect to the details of a method for producing a partial ester having an acid value of less than 2 mgKOH, reference can be made, for example, to Unexamined Japanese Patent Application Laid-Open Specification No. Sho 51-65705.)

1-Monoglyceride of a fatty acid can be produced by a method in which 1,2-isopropylidene glycerol and a fatty acid chloride are subjected to a reaction, and the resultant reaction product (i.e., an ester) is treated with an inorganic acid. On the other hand, 2-monoglyceride of a fatty acid can be produced by a method in which 1,3-benzylidene glycerol and a fatty acid chloride are subjected to a reaction, and the resultant reaction product (i.e., an ester) is subjected to a catalytic reduction. Each of the thus obtained 1-monoglyceride of a fatty acid and 2-monoglyceride of a fatty acid has an acid value of less than 2 mgKOH, wherein, in general, the acid value is approximately 1 mgKOH.

In step (2) above, the acid value of the partial ester (having an acid value of less than 2 mgKOH) which is provided in step (1) above, is increased to a value in the desired range (of from 2 to 20 mgKOH), to thereby obtain the desired partial ester (i.e., the partial ester (B)). With respect to the method for increasing the acid value of a partial ester to a value in the desired range, there is no particular limitation. For example, the acid value can be increased by the following method.

The partial ester having an acid value of less than 2 mgKOH provided in step (1) above is placed in a container purged with nitrogen gas. The container containing the partial ester is heated at a temperature of from 150 to 200° C. The partial ester in the container is stirred in the molten state while keeping the internal temperature of the container in the above-mentioned range, thereby increasing the acid value of the partial ester. The stirring under heating is continued, and samples are taken from the partial ester in the molten state at regular intervals (e.g., every 1 hour) for the measurement of the acid value by the above-mentioned measuring method. By performing the measurement of the acid values of the samples, the increase in the acid value can be confirmed. By continuing the stirring of the partial ester in the molten state until the acid value of the partial ester reaches a value in the desired range, the desired partial ester can be obtained.

With respect to the time needed for the acid value of the partial ester (which is stirred in the molten state) to reach a value in the desired range (i.e., the time for which the stirring of the partial ester in the molten state is performed), it depends on the type of partial ester used, the heating temperature, conditions of stirring and the like; however, in general, the time for the stirring is at least five hours.

The resin composition of the present invention can be produced by subjecting the aromatic polycarbonate resin (A) and the partial ester (B) to melt-kneading by the conventional method using, for example, a conventional extruder or mixing machine, such as a single-screw extruder, a multi-screw extruder, a Banbury mixer, or a kneader. The melt-kneading temperature is generally in the range of from 230 to 330° C. If desired, the resin composition of the present invention may contain an additive, such as a heat stabilizer, an antioxidant, a weathering stabilizer, a UV absorber, a mold release agent, a lubricant, an antistatic agent, a plasticizer and an acidic compound having a pKa value of 5 or less. With respect to the mixing of an additive with the other components of the resin composition, there is no particular limitation. For example, an additive may be charged into a reactor containing the polycarbonate resin in the molten state after completion of the polymerization reaction for producing the polycarbonate resin. Alternatively, the mixing of an additive with the other components of the resin composition may be performed by a method in which the produced polycarbonate is first pelletized and, then, an additive is mixed with the resultant pellets, whereupon the resultant mixture of the pellets and the additive is subjected to melt-kneading. These additives may be used in an amount generally employed in the conventional polycarbonate resin composition.

Preferred examples of heat stabilizers include phosphorus compounds, phenolic compounds, sulfur compounds, epoxy compounds, hindered amines and acidic compounds.

Examples of phosphorus compounds which can be used as the heat stabilizer include phosphorus-containing acids, phosphorous esters, phosphinic esters, phosphoric esters and phosphonic esters. Examples of phosphorus-containing acids include phosphoric acid, phosphorous acid, hypophosphorous acid, pyrophosphoric acid, a polyphosphoric acid and phosphinic acids. Examples of phosphorous esters include phosphorous triesters, phosphorous diesters and phosphorous monoesters.

Preferred examples of phosphorous triesters include tris (2,4-di-t-butylphenyl)phosphite, tris(nonylphenyl)phosphite, tris(dinonylphenyl)phosphite, triphenyl phosphate, tetraphenyldipropylene glycol phosphite, tetra(tridecyl)-4,4'-isopropylidenediphenyl diphosphite, bis(tridecyl)pentaerythritol diphosphite, bis(nonylphenyl)pentaerythritol diphosphite, bis(2,4-di-t-butylphenyl)pentaerythritol diphosphite, bis(2,6-di-t-butyl-4-methylphenyl)pentaerythritol diphosphite, distearyl pentaerythritol diphosphite, hydrogenated bisphenol A/pentaerythritol phosphite polymer, and tetraphenyltetra(tridecyl)pentaerythritol tetraphosphite.

Preferred examples of phosphorous diesters include diphenylhydrogen phosphite, bis(nonylphenyl)hydrogen phosphite, bis(2,4-di-t-butylphenyl)hydrogen phosphite, dicresylhydrogen phosphite, bis(p-t-butylphenyl)hydrogen phosphite, and bis(p-hexylphenyl)hydrogen phosphite.

Preferred examples of phosphorous monoesters include phenyldihydrogen phosphite, nonylphenyldihydrogen phosphite and 2,4-di-t-butylphenyldihydrogen phosphite.

Examples of phenolic compounds which can be used as the heat stabilizer include 2,6-di-t-butyl-p-cresol, 2,6-di-t-butyl-p-anisole, 2,6-di-t-butyl-4-ethylphenol, 2,2'-methylenebis(6-t-butyl-p-cresol), 2,2'-methylenebis(4-ethyl-6-t-butyl-p-phenol), 4,4'-methylenebis(6-t-butyl-p-cresol), 4,4'-butylidenebis(6-t-butyl-m-cresol), tetrakis(methylene-3-(3',5'-di-t-butyl-4'-hydroxyphenyl)propionate)methane, 4,4'-thiobis(6-t-butyl-m-cresol), stearyl-β-(3,5-di-t-butyl-4-hydroxyphenyl)propionate, 1,3,5-trimethyl-2,4,6-tris(3,5-di-t-butyl-4-hydroxybenzyl)benzene, 1,1,3-tris(2-methyl-4-hydroxy-5-t-butylphenyl)butane, and triethylene glycol bis (3-(3-t-butyl-5-methyl-4-hydroxyphenyl)propionate).

Examples of sulfur compounds which can be used as the heat stabilizer include benzensulfinic acid, p-toluenesulfinic acid, benzenesulfonic acid, p-toluenesulfonic acid, naphthalenesulfonic acid, and methyl, ethyl, butyl, octyl or phenyl esters thereof. Further examples of sulfur compounds which can be used as the heat stabilizer include dilauryl-3,3'-thiodipropionate, ditridecyl-3,3'-thiodipropionate, dimyristyl-3,3'-thiodipropionate, distearyl-3,3'-thiodipropionate and pentaerythritol(β-lauryl thiopropionate).

Examples of epoxy compounds which can be used as the heat stabilizer include fats and oils, such as epoxidized soybean oil and epoxidized linseed oil; glycidyl compounds, such as phenyl glycidyl ether, allyl glycidyl ether, t-butylphenyl glycidyl ether, diglycidyl ether of bisphenol A, diglycidyl ether of tetrabromobisphenol A, diglycidyl phthalate and diglycidyl hexahydrophthalate; epoxycyclohexane compounds, such as 3,4-epoxycyclohexylmethyl-3,4-epoxycyclohexane carboxylate, 3,4-epoxy-6-methylcyclohexylmethyl-3,4-epoxycyclohexane carboxylate, 2,3-epoxycyclohexylmethyl-3,4-epoxycyclohexane carboxylate, 4-(3,4-epoxy-5-methylcyclohexyl)butyl-3,4-epoxycyclohexane carboxylate, 3,4-epoxycyclohexylethylene oxide, cyclohexylmethyl-3,4-epoxycyclohexane carboxylate, 3,4-epoxy-6-methyl-cyclohexylmethyl-6-methylcyclohexane carboxylate, bisepoxycyclohexyl adipate, octadecyl-2,2'-dimethyl-3,4-epoxycyclohexane carboxylate, N-butyl-2,2'-dimethyl-3,4-epoxycyclohexane carboxylate, cyclohexyl-2-methyl-3,4-epoxycyclohexane carboxylate, N-butyl-2-isopropyl-3,4-epoxy-5-methylcyclohexane carboxylate, octadecyl-3,4-epoxycyclohexane carboxylate, 2-ethylhexyl-3,4-epoxycyclohexane carboxylate, 4,6-dimethyl-2,3-epoxycyclohexyl-3,4-epoxycyclohexane carboxylate, diethyl-4,5-epoxy-cis-1,2-cyclohexane carboxylate, di-n-butyl-3-t-butyl-4,5-epoxy-cis-1,2-cyclohexane carboxylate, 3,4-dimethyl-1,2-epoxycyclohexane, 3,5-dimethyl-1,2-epoxycyclohexane and 3-methyl-5-t-butyl-1,2-epoxycyclohexane; bisepoxydicyclopentadienyl ether; butadiene diepoxide, tetraphenylethylene epoxide; epoxidized polybutadiene; 4,5-epoxytetrahydrophthalic anhydride; and 3-t-butyl-4,5-epoxytetrahydrophthalic anhydride.

Examples of acidic compounds which can be used as the heat stabilizer include inorganic acids, such as boric acid; organic acids, such as adipic acid, citric acid and acetic acid; sulfonic acids, such as benzenesulfonic acid and p-toluenesulfonic acid; and sulfonic esters, such as ethyl benzenesulfonate and butyl p-toluenesulfonate.

The heat stabilizers may be used individually or in combination. With respect to the amount of the heat stabilizer, there is no particular limitation. The amount of the heat stabilizer is generally from 0.0005 to 0.05 part by weight, preferably from 0.001 to 0.04 part by weight, more preferably from 0.005 to 0.03 part by weight, relative to 100 parts by weight of the polycarbonate resin (A).

The polycarbonate resin composition of the present invention for use in the production of a substrate for an optical information medium can be advantageously used for the production of a disc-shaped substrate (having a thickness of 1.2 mm or less) for an optical information medium, such as a CD, a CD-R, a CD-RW, an MD, an MO, a DVD or a DVD-RAM. With respect to the method for molding the polycarbonate resin composition of the present invention to obtain the substrate for an optical information medium, there is no particular limitation. For example, the substrate can be produced by subjecting the polycarbonate resin composition of the present invention to an injection molding using an injection molding machine for producing optical discs. It is preferred that the injection molding is performed under conditions wherein the molding temperature is from 300 to 390° C., the mold temperature is from 40 to 130° C., and the molding cycle time is from 2 to 15 seconds. As the injection molding machine for producing optical discs, a conventional one can be used.

BEST MODE FOR CARRYING OUT THE INVENTION

The present invention will be further described in more detail with reference to the following Examples and Comparative Examples, which should not be construed as limiting the scope of the present invention.

In the following Examples and Comparative Examples, various properties were measured and evaluated as follows.

(1) Measurement of the Weight Average Molecular Weight of a Polycarbonate Resin:

The weight average molecular weight of a polycarbonate resin was measured by gel permeation chromatography (GPC) using tetrahydrofuran (as a solvent) and a polystyrene gel column. As a calibration curve, a modified calibration curve for a polycarbonate was used, which is obtained by modifying a calibration curve obtained with respect to standard monodisperse polystyrene samples, wherein the modification of the calibration curve is made by a calculation using the following formula:

$$M_{pc} = 0.3591\, M_{ps}^{1.0388}$$

wherein $M_{pc}$ represents the molecular weight of the polycarbonate resin, and $M_{ps}$ represents the molecular weight of the standard polystyrene.

(2) Determination of Heterounit (2') in a Polycarbonate Resin:

55 mg of a polycarbonate resin was dissolved in 2 ml of tetrahydrofuran. To the resultant solution, 0.5 ml of 5 N solution of potassium hydroxide in methanol was added, and the resultant mixture was stirred at room temperature for 2 hours to completely hydrolyze the polycarbonate resin. The resultant reaction mixture was mixed with 0.3 ml of concentrated hydrochloric acid, and the resultant mixture was subjected to reversed phase liquid chromatography.

The reversed phase liquid chromatography was performed, using a 991L UV detector (manufactured and sold by Waters Corporation, U.S.A) and Inertsil ODS-3 column (registered trade mark, manufactured and sold by GL Science Inc., Japan). A mixture of methanol and 0.1 weight % aqueous solution of phosphoric acid was used as an eluent, and measurement was carried out by gradient elution technique at a gradient wherein the volume ratio (methanol/0.1 weight % aqueous solution of phosphoric acid) is changed from 20/80 at the start to 100/0. The absorbance at 300 nm was measured using the UV detector. Absorbance coefficients for determining recurring unit (1) and heterounit (2') were obtained by using a standard compound (as a standard compound, a hydroxy compound having a structure formed by hydrolysis of heterounit (2') was used).

(3) Measurement of the Acid Value of a Partial Ester Obtained from a Saturated Aliphatic Carboxylic Acid and a Polyhydric Alcohol:

100 ml of isopropanol was added to 2.5 g of a partial ester to thereby dissolve the partial ester. To the resultant solution was added phenolphthalein as an indicator. The resultant mixture was subjected to titration using a 0.1 mol/L standard solution of potassium hydroxide, to thereby obtain the acid value (mgKOH) of the partial ester. In the measurement of the acid value, when it was expected that the partial ester had an acid value of 1 or less, the amount of the partial ester subjected to measurement was changed to 20 g; when it was expected that the partial ester had an acid value of from 1 to 4, the amount of the partial ester subjected to measurement was changed to 10 g; and when it was expected that the partial ester had an acid value of 15 or more, the amount of the partial ester subjected to measurement was changed to 0.5 g.

(4) Evaluation of the Moldability of a Polycarbonate Resin Composition:

A disc-shaped substrate (thickness: 1.2 mm) for a CD-R (hereinafter, this substrate is frequently referred to simply as a "CD-R substrate disc"), which had microgrooves formed on the surface thereof, was produced by subjecting a polycarbonate resin composition to an injection molding, using an injection molding machine for producing optical discs (MDM1; manufactured and sold by Meiki Co., Ltd., Japan), under conditions wherein the molding temperature was 330° C., the mold temperature was 100° C., and the molding cycle was 5 seconds (i.e., high-cycle molding).

As a yardstick for the moldability, with respect to the produced CD-R substrate disc, the birefringence and the transferability were evaluated using a disc analyzing system (PROmeteus MT136, manufactured and sold by Dr. Schenk GmbH, Germany). The birefringence (nm) of a CD-R substrate disc is defined by the difference between the maximum value and minimum value of refractive index values as measured in the radial direction of the disc. It is desirable that the birefringence value of a CD-R substrate disc is not more than 40 nm.

The transferability (%) of a CD-R substrate disc is calculated by the following formula:

$$\text{Transferability (\%)} = (D_1/D_2) \times 100$$

wherein $D_1$ represents the average value of microgroove depths as measured at a distance of 55 mm from the center of the substrate disc, and $D_2$ represents the microgroove depth of the stamper (i.e., a mold for forming microgrooves and micropits on a substrate) used.

It is desirable that the transferability value of a CDR substrate disc is at least 95%.

With respect to the produced CD-R substrate disc, the anti-cloud properties were measured by a method in which 100 CD-R substrate discs were subjected to sputtering with aluminum on the microgrooved faces of the discs, and the resultant sputtered, microgrooved faces of the discs were observed to examine whether or not a cloud occurred. The anti-cloud properties of the resin composition were evaluated, based on the number of discs in which the occurrence of a cloud was observed, in accordance with the following criteria:

⊚: Occurrence of a cloud was not observed,

○: Occurrence of a cloud was observed in 1 to 3 discs,

Δ: Occurrence of a cloud was observed in 4 to 10 discs, and x: Occurrence of a cloud was observed in 11 or more discs.

It is desirable that the anti-cloud properties of a CDR substrate disc are evaluated to be either "⊚: Occurrence of a cloud was not observed" or "○: Occurrence of a cloud was observed in 1 to 3 discs".

(5) Mechanical Strength of a CD-R Substrate Disc:

Thirty CD-R substrate discs as produced above were subjected to the evaluation of the mechanical strength thereof. The mechanical strength of each substrate disc was evaluated by a flexural test in which the distance between the supports was 40 mm and the bending of the disc was performed at a rate of 300 mm/minute, wherein the bending of the disc was continued until the entire disc being bent came in the space between the supports. The evaluation of the mechanical strength was made, based on the number of discs broken.

In the Examples and Comparative Examples, the below-described fatty acid esters (partial esters) were used to produce a polycarbonate resin composition.

Glycerol monostearates having acid values of 1 mgKOH, 8 mgKOH, 12 mgKOH, 17 mgKOH and 25 mgKOH, respectively:

Provided was a commercially available glycerol monostearate (Rikemal S-100; manufactured and sold by Riken Vitamin Co., Ltd., Japan) having an acid value of 1 mgKOH. This commercially available product as such was used as a glycerol monostearate having an acid value of 1 mgKOH. For producing glycerol monostearates having acid values higher than 1 mgKOH, the acid value of this commercially available glycerol monostearate was increased by the following method. The glycerol monostearate was placed in a container purged with nitrogen gas. The container containing the glycerol monostearate was heated at a temperature of from 150 to 200° C. The glycerol monostearate in the container was stirred in the molten state while keeping the internal temperature of the container in the above-mentioned range, thereby increasing the acid value of the glycerol monostearate. The stirring under heating was continued, and sampling of the glycerol monostearate in the molten state was performed at intervals of 1 hour for the measurement of the acid value by the above-mentioned measuring method. By performing the measurement of the acid values of the samples, the increase in the acid value was confirmed. The desired glycerol monostearates having acid values of 8 mgKOH, 12 mgKOH, 17 mgKOH and 25 mgKOH, respectively, were taken out from the container when these acid values were reached during the stirring under heating.

Pentaerythritol Monostearate having an Acid Value of 5 mgKOH:

Provided was a commercially available pentaerythritol monostearate (Rikester EW-440A; manufactured and sold by Riken Vitamin Co., Ltd., Japan) having an acid value of 1 mgKOH. The acid value of this commercially available pentaerythritol monostearate was increased in substantially the same manner as in the case of the above-mentioned commercially available glycerol monostearate, to thereby obtain pentaerythritol monostearate having an acid value of 5 mgKOH.

Glycerol Monopalmitate having an Acid Value of 13 mgKOH:

Provided was a commercially available glycerol monopalmitate (Rikemal P-100; manufactured and sold by Riken Vitamin Co., Ltd., Japan) having an acid value of 1 mgKOH. The acid value of this commercially available glycerol monopalmitate was increased in substantially the same manner as in the case of the above-mentioned commercially available glycerol monostearate, to thereby obtain glycerol monopalmitate having an acid value of 13 mgKOH.

Glycerol Tristearate having an Acid Value of 3 mgKOH:

Provided was a commercially available glycerol tristearate (Rikemal VT; manufactured and sold by Riken Vitamin Co., Ltd., Japan) having an acid value of 1 mgKOH. The acid value of this commercially available glycerol tristearate was increased in substantially the same manner as in the case of the above-mentioned commercially available glycerol monostearate, to thereby obtain glycerol tristearate having an acid value of 3 mgKOH.

EXAMPLE 1

An aromatic polycarbonate resin was produced using a production system comprising two dissolving/mixing tanks for raw materials; two vertical agitation type polymerizer vessels; a twin-screw horizontal agitation type polymerizer vessel (L/D=6) having two agitating blades each having a rotation diameter of 140 mm; and a wire-wetting fall polymerizer having a perforated plate and 50 wires provided in association with the perforated plate, wherein each wire was made of stainless steel SUS316L and had a diameter of 1 mm. The polymerization was performed in the continuous manner, except that only the two dissolving/mixing tanks for raw materials were operated alternately in the batch-wise manner.

Each of the two dissolving/mixing tanks for raw materials was operated under conditions wherein the heating temperature was 180° C., the pressure was atmospheric pressure, and nitrogen gas (oxygen concentration: 0.5 ppm) was flowed at a flow rate of 1 liter/hr to prevent the intrusion of air into the tank. 80 kg of a powdery mixture of particulate bisphenol A and particulate diphenyl carbonate (diphenyl carbonate/bisphenol A molar ratio: 1.10) was provided and placed in a vacuum of 40 mmHg, and the air contained in the mixture was purged with nitrogen gas five times. The thus treated powdery mixture of the raw materials and 7 mg of sodium hydroxide were charged into the dissolving/mixing tank for raw materials, and the contents of the tank were melted and stirred for 5 hours for homogeneous mixing before being transferred to the next step.

The first vertical agitation type polymerizer vessel was operated under conditions wherein the reaction temperature was 234° C., the reaction pressure was 98 mmHg, and the liquid volume in the polymerizer vessel was maintained at 20 liters. The second vertical agitation type polymerizer vessel was operated under conditions wherein the reaction temperature was 250° C., the reaction pressure was 6 mmHg, and the liquid volume in the polymerizer vessel was maintained at 20 liters. The twin-screw horizontal agitation type polymerizer vessel was operated under conditions wherein the reaction temperature was 260° C., the reaction pressure was 2.0 mmHg, and the liquid volume in the polymerizer vessel was maintained at 10 liters. The wire-wetting fall polymerizer was operated under conditions wherein the reaction temperature was 260° C., the reaction pressure was 1.0 mmHg, and the volume of the reaction mixture obtained at the bottom of the polymerizer was maintained at 20 liters. By performing the polymerization under the above-mentioned conditions, an aromatic polycarbonate resin was produced. With respect to the thus obtained polycarbonate, the measurement of the weight average molecular weight and of the amount of the heterounit (2') were performed. As a result, it was found that the weight average molecular weight was 15,600 and the amount of the heterounit (2') was 0.13 mole %, based on the total molar amount of the recurring units (1).

100 Parts by weight of the above-obtained polycarbonate resin and 0.05 part by weight of glycerol monostearate having an acid value of 8 mgKOH were subjected to melt-kneading using a twin-screw extruder (model name: PCM30; manufactured and sold by Ikegai Ltd., Japan) (barrel temperature: 280° C.), to thereby obtain a polycarbonate resin composition.

Using the thus obtained polycarbonate resin composition, substrate discs were produced, and the obtained substrate discs were used for the evaluation of the properties of the resin composition. The results of the evaluation are shown in Table 1 below. The substrate discs exhibited excellent properties; specifically, the transferability was 100%, the birefringence was from 0 to 10 nm, there was no occurrence of a cloud, and high mechanical strength was exhibited.

EXAMPLE 2

100 Parts by weight of the polycarbonate resin obtained in Example 1, 0.02 part by weight of tris(2,4-di-t-butylphenyl) phosphite and 0.03 part by weight of glycerol monostearate having an acid value of 12 mgKOH were subjected to melt-kneading using a twin-screw extruder (model name: PCM30; manufactured and sold by Ikegai Ltd., Japan) (barrel temperature: 280° C.), to thereby obtain a polycarbonate resin composition.

Using the thus obtained polycarbonate resin composition, substrate discs were produced, and the obtained substrate discs were used for the evaluation of the properties of the resin composition. The results of the evaluation are shown in Table 1 below. The substrate discs exhibited excellent properties; specifically, the transferability was 100%, the birefringence was from 0 to 10 nm, there was no occurrence of a cloud, and high mechanical strength was exhibited.

COMPARATIVE EXAMPLES 1 to 5

Polycarbonate resin compositions were produced in substantially the same manner as in Example 1, except that the fatty acid ester (partial ester) was changed as shown in Table 1.

Using the thus obtained polycarbonate resin compositions individually, substrate discs were produced, and the obtained substrate discs were used for the evaluation of the properties of the resin compositions. The results of the evaluation are shown in Table 1 below. The following was found. The substrate discs produced in Comparative Example 1 exhibited a transferability of 100% and a birefringence of from 10 to 30 nm. The substrate discs produced in Comparative Example 2 exhibited a transferability of 100% and a birefringence of from 10 to 25 nm. The substrate discs produced in Comparative Example 3 exhibited a transferability of 90% and a birefringence of from 10 to 30 nm. The substrate discs produced in Comparative Example 4 exhibited a transferability of 100% and a birefringence of from 10 to 30 nm. The substrate discs produced in Comparative Example 5 exhibited a transferability of 100% and a birefringence of from 10 to 40 nm.

COMPARATIVE EXAMPLES 6 AND 7

Polycarbonate resin compositions were produced in substantially the same manner as in Example 1, except that the reaction pressure in the wire-wetting fall polymerizer was changed to 1.4 mmHg (for Comparative Example 6) and 0.8 mmHg (for Comparative Example 7).

Using the thus obtained polycarbonate resin compositions individually, an attempt was made to produce substrate discs for the evaluation of the properties of the resin compositions. The results of the evaluation are shown in Table 1 below. (The resin composition produced in Comparative Example 6 had such a low weight average molecular weight that it was not possible to perform molding of the resin composition. On the other hand, the resin composition produced in Comparative Example 7 had such a high weight average molecular weight and hence a high melt viscosity that it was not possible to perform molding of the resin composition.)

EXAMPLE 3

A polycarbonate resin composition was produced in substantially the same manner as in Example 1, except that the twin-screw horizontal agitation type polymerizer vessel was operated under conditions wherein the reaction temperature was 270° C. and the reaction pressure was 4.0 mmHg; that the wire-wetting fall polymerizer was operated under conditions wherein the reaction temperature was 270° C. and the reaction pressure was 2.0 mmHg; and that the amount of glycerol monostearate used as a partial ester was changed to 0.03 part by weight.

Using the thus obtained polycarbonate resin composition, substrate discs were produced, and the obtained substrate discs were used for the evaluation of the properties of the resin composition. The results of the evaluation are shown in Table 1 below. The substrate discs exhibited excellent properties; specifically, the transferability was 100%, the birefringence was from 0 to 10 nm, and high mechanical strength was exhibited.

EXAMPLE 4

40 kg of a powdery mixture of particulate bisphenol A and particulate diphenyl carbonate (diphenyl carbonate/bisphenol A molar ratio: 1.10) and 4 mg of sodium hydroxide were charged into a 100-liter vertical agitation type polymerizer vessel. The internal pressure of the polymerizer vessel was decreased to a vacuum of 40 mmHg, and the atmosphere in the polymerizer vessel was purged with nitrogen gas five times. Then, temperature elevation of the contents of the polymerizer vessel was started and continued while flowing nitrogen gas at a flow rate of 10 liters/hr. Stirring of the contents of the polymerizer vessel was started when the reaction temperature reached 180° C. 30 minutes after the start of the stirring, the reaction temperature was elevated to 230° C., and the reaction pressure was stepwise reduced to 2 mmHg, and the by-produced phenol was removed from the reaction system, to thereby obtain a polycarbonate. The obtained polycarbonate had a weight average molecular weight of 6,800.

The thus obtained polycarbonate and acetone were fed to a co-rotating intermeshing twin-screw kneader (having two screws rotating in the same direction), wherein the feeding rates of the polycarbonate and aceton were, respectively, 1.5 kg/hr and 0.8 kg/hr, to thereby obtain a crystallized polycarbonate. The obtained crystallized polycarbonate was dried. 15 kg of the resultant dried crystallized polycarbonate was charged into a 70-liter, tumbler type, solid-state polymerizer, and a reaction was performed at 220° C. under a pressure of 2 mmHg for 4 hours, to thereby obtain a polycarbonate. The obtained polycarbonate had a weight average molecular weight of 14,800.

100 Parts by weight of the above-obtained polycarbonate resin and 0.05 part by weight of pentaerythritol monostearate having an acid value of 5 mgKOH were subjected to melt-kneading using a twin-screw extruder (model name: PCM30; manufactured and sold by Ikegai Ltd., Japan) (barrel temperature: 280° C.), to thereby obtain a polycarbonate resin composition.

Using the thus obtained polycarbonate resin composition, substrate discs were produced, and the obtained substrate discs were used for the evaluation of the properties of the resin composition. The results of the evaluation are shown in Table 1 below. The substrate discs exhibited excellent properties; specifically, the transferability was 100%, the birefringence was from 0 to 10 nm, there was no occurrence of a cloud, and high mechanical strength was exhibited.

EXAMPLE 5

100 Parts by weight of the polycarbonate resin obtained in Example 1 and 0.03 part by weight of glycerol monopalmitate having an acid value of 13 mgKOH were subjected to melt-kneading using a twin-screw extruder (model name: PCM30; manufactured and sold by Ikegai Ltd., Japan) (barrel temperature: 280° C.), to thereby obtain a polycarbonate resin composition.

Using the thus obtained polycarbonate resin composition, substrate discs were produced, and the obtained substrate discs were used for the evaluation of the properties of the resin composition. The results of the evaluation are shown in Table 1 below. The substrate discs exhibited excellent properties; specifically, the transferability was 100%, the birefringence was from 0 to 10 nm, there was no occurrence of a cloud, and high mechanical strength was exhibited.

EXAMPLE 6

100 Parts by weight of the polycarbonate resin obtained in Example 1, 0.015 part by weight of glycerol monostearate having an acid value of 8 mgKOH and 0.02 part by weight of pentaerythritol monostearate having an acid value of 5 mgKOH were subjected to melt-kneading using a twin-screw extruder (model name: PCM30; manufactured and sold by Ikegai Ltd., Japan) (barrel temperature: 280° C.), to thereby obtain a polycarbonate resin composition.

Using the thus obtained polycarbonate resin composition, substrate discs were produced, and the obtained substrate discs were used for the evaluation of the properties of the resin composition. The results of the evaluation are shown in Table 1 below. The substrate discs exhibited excellent properties; specifically, the transferability was 100%, the birefringence was from 0 to 10 nm, there was no occurrence of a cloud, and high mechanical strength was exhibited.

EXAMPLE 7

A polycarbonate resin composition was produced in substantially the same manner as in Example 6, except that 0.02 part by weight of tris(2,4-di-t-butylphenyl)phosphite was additionally used as a component.

Using the thus obtained polycarbonate resin composition, substrate discs were produced, and the obtained substrate discs were used for the evaluation of the properties of the resin composition. The results of the evaluation are shown in Table 1 below. The substrate discs exhibited excellent properties; specifically, the transferability was 100%, the birefringence was from 0 to 10 nm, there was no occurrence of a cloud, and high mechanical strength was exhibited.

TABLE 1

| Examples and Comparative Examples | Polycarbonate resin | | Partial ester | | | Evaluation of the disc produced | |
|---|---|---|---|---|---|---|---|
| | Weight average molecular weight | Amount of heterounits (mole %) | Type | Amount (ppm)[1] | Acid value (mgKOH) | Occurrence of a cloud | Mechanical strength (number of discs broken out of 30 discs) |
| Ex. 1 | 15,600 | 0.13 | Glycerol monostearate | 500 | 8 | ⊚ | 0 |
| Ex. 2 | 15,600 | 0.13 | Glycerol monostearate | 300 | 12 | ⊚ | 0 |
| Ex. 3 | 15,600 | 0.22 | Glycerol monostearate | 300 | 17 | ○ | 3 |
| Ex. 4 | 14,800 | 0.02 | Pentaerythritol monostearate | 300 | 5 | ⊚ | 2 |
| Ex. 5 | 15,600 | 0.13 | Glycerol monopalmitate | 300 | 13 | ⊚ | 0 |
| Ex. 6 | 15,600 | 0.13 | Glycerol monostearate | 150 | 8 | ⊚ | 0 |
| | | | Pentaerythritol monostearate | 200 | 5 | | |
| Ex. 7 | 15,600 | 0.13 | same as above | same as above | same as above | ⊚ | 0 |
| Compara. Ex. 1 | 15,600 | 0.13 | Glycerol monostearate | 300 | 1 | Δ | 20 |
| Compara. Ex. 2 | 15,600 | 0.13 | Glycerol monostearate | 500 | 25 | X | 13 |
| Compara. Ex. 3 | 15,600 | 0.13 | Glycerol monostearate | 70 | 12 | X | 18 |
| Compara. Ex. 4 | 15,600 | 0.13 | Glycerol monostearate | 1300 | 12 | Δ | 16 |
| Compara. Ex. 5 | 15,600 | 0.13 | Glycerol tristearate | 500 | 3 | X | 2 |
| Compara. Ex. 6 | 12,000 | 0.12 | Glycerol monostearate | 500 | 8 | The resin composition was not moldable. | |
| Compara. Ex. 7 | 19,000 | 0.13 | Glycerol monostearate | 500 | 8 | The resin composition was not moldable. | |

Note:
[1]Each value is expressed in terms of ppm by weight, relative to the weight of the polycarbonate. A quotient obtained by dividing a ppm value by 10,000 corresponds to the parts by weight of the partial ester, relative to 100 parts by weight of the polycarbonate resin.

INDUSTRIAL APPLICABILITY

Use of the polycarbonate resin composition of the present invention in the production of a substrate for an optical information medium is advantageous in that a substrate (for an optical information medium) which has high mechanical strength and in which the occurrence of a "cloud" (i.e., haze) is suppressed, can be produced by the so-called "high-cycle molding" (i.e., the molding can be performed with a short cycle time). By virtue of such excellent properties, the polycarbonate resin composition of the present invention can be very advantageously used in the production of a substrate for an optical information medium, such as an optical disc (e.g., a CD or a DVD).

The invention claimed is:

1. A polycarbonate resin composition for use in the production of a substrate for an optical information medium, comprising:
   100 parts by weight of (A) an aromatic polycarbonate resin having a weight average molecular weight of from 13,000 to 18,000,
   wherein said aromatic polycarbonate resin (A) is produced by subjecting an aromatic dihydroxy compound and a carbonic diester to a transesterification reaction, and is substantially free of a chlorine atom, and
   0.01 to 0.1 part by weight of (B) a partial ester obtained from a saturated aliphatic carboxylic acid having 10 to 30 carbon atoms and a di- to hexahydric alcohol, said partial ester (B) having an acid value of from 2 to 20 mgKOH.

2. The polycarbonate resin composition according to claim 1, wherein said aromatic polycarbonate resin (A) comprises a plurality of aromatic polycarbonate main chains, each comprising recurring units each independently represented by the following formula (1):

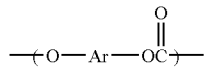
(1)

wherein Ar represents a divalent $C_5$-$C_{200}$ aromatic group, wherein said plurality of aromatic polycarbonate main chains collectively contain therein at least one heterounit, said heterounit being represented by the following formula (2):

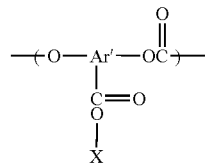
(2)

wherein Ar' represents a trivalent $C_5$-$C_{200}$ aromatic group, and X represents a polycarbonate chain having recurring units each represented by the formula

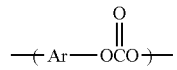

wherein
Ar is as defined above and having a molecular weight of from 214 to 6,000, and
wherein, when said polycarbonate main chains contain a plurality of heterounits, the heterounits are the same or different,
the amount of said heterounit (2) being from 0.03 to 0.20 mole %, based on the total molar amount of said recurring units (1).

3. The polycarbonate resin composition according to claim 1 or 2, wherein said partial ester (B) is at least one member selected from the group consisting of glycerol monostearate and glycerol monopalmitate.

4. The polycarbonate resin composition according to claim 1 or 2, which is a substrate for an optical information medium, said substrate being produced by injection molding.

* * * * *